US008839356B2

(12) United States Patent
Rothman et al.

(10) Patent No.: US 8,839,356 B2
(45) Date of Patent: Sep. 16, 2014

(54) METHODS AND APPARATUSES FOR PROCESSING WAKE EVENTS OF COMMUNICATION NETWORKS

(75) Inventors: Michael A. Rothman, Puyallup, WA (US); Arvind Kumar, Beaverton, OR (US); Vincent J. Zimmer, Federal Way, WA (US); Patrick G. Kutch, Beaverton, OR (US); Omer Levy, Modiin (IL)

(73) Assignee: Intel Corporation, Santa Clara, CA (US)

( * ) Notice: Subject to any disclaimer, the term of this patent is extended or adjusted under 35 U.S.C. 154(b) by 1676 days.

(21) Appl. No.: 12/006,150

(22) Filed: Dec. 31, 2007

(65) Prior Publication Data

US 2009/0172443 A1 Jul. 2, 2009

(51) Int. Cl.
| | |
|---|---|
| *G06F 1/00* | (2006.01) |
| *G06F 7/04* | (2006.01) |
| *G06F 17/30* | (2006.01) |
| *H04L 9/32* | (2006.01) |
| *H04L 29/06* | (2006.01) |
| *G06F 21/85* | (2013.01) |

(52) U.S. Cl.
CPC .............. *H04L 63/08* (2013.01); *H04L 63/083* (2013.01); *G06F 21/85* (2013.01); *Y02B 60/34* (2013.01)
USPC .............. 726/2; 713/168; 713/323; 713/324; 726/27

(58) Field of Classification Search
USPC .................................. 726/22–25, 6; 713/182
See application file for complete search history.

(56) References Cited

U.S. PATENT DOCUMENTS

| | | | | | |
|---|---|---|---|---|---|
| 6,101,608 | A  * | 8/2000 | Schmidt et al. | ................ | 726/2 |
| 6,381,700 | B1 * | 4/2002 | Yoshida | ............................ | 726/4 |
| 7,089,422 | B2 * | 8/2006 | Pelly | ............................. | 713/184 |
| 7,809,966 | B2 * | 10/2010 | Imao | ............................. | 713/320 |
| 2002/0124064 | A1 * | 9/2002 | Epstein et al. | ................ | 709/221 |
| 2002/0124245 | A1 * | 9/2002 | Maddux et al. | ............... | 717/176 |
| 2004/0221154 | A1 * | 11/2004 | Aggarwal | ..................... | 713/151 |
| 2005/0015604 | A1 * | 1/2005 | Sundararajan et al. | ....... | 713/184 |
| 2005/0066069 | A1 * | 3/2005 | Kaji | ................................. | 710/1 |
| 2006/0031476 | A1 * | 2/2006 | Mathes et al. | ............... | 709/224 |
| 2006/0200681 | A1 * | 9/2006 | Kato et al. | .................... | 713/193 |
| 2007/0162777 | A1 * | 7/2007 | Imao | ............................. | 713/320 |
| 2008/0168118 | A1 * | 7/2008 | Hickey et al. | ................. | 709/201 |

\* cited by examiner

*Primary Examiner* — Fatoumata Traore
(74) *Attorney, Agent, or Firm* — Schubert Law Group PLLC (57) ABSTRACT

Methods, apparatuses, and computer program products that respond to wake events of communication networks are disclosed. One or more embodiments comprise setting a wake password of a computing device, such as a notebook computer or a server. Some of the embodiments comprise receiving a wake request from a communications network, establishing a secure communication session, and setting the wake password with the secure communication session. Some embodiments comprise an apparatus having a network controller to allow a platform to communicate via a communications network, non-volatile memory that stores a wake password, and a management controller that may communicate with a management console via a secure communication session to update the wake password. One or more embodiments the network controller may wake management hardware and/or wake the management controller while keeping one or more of the devices in the power conservation mode.

19 Claims, 4 Drawing Sheets

METHODS AND APPARATUSES FOR PROCESSING WAKE EVENTS OF COMMUNICATION NETWORKS

FIELD

The present invention is in the field of computing apparatuses that communicate with other apparatuses via communication networks. More particularly, the present invention relates to methods, apparatuses, and computer program products that respond to wake events of communication networks.

BACKGROUND

Wake On LAN (WOL, where LAN stands for local area network) is a networking technology that that allows one computing device to boot a remotely located target computing device, even though the target computing device is either turned off or in a power conservation mode. One common wake mechanism that may achieve this remote booting is referred to as a "magic packet". A magic packet is a broadcast communication packet with a specific header, followed by sixteen instances of the media access control (MAC) address of the target system. A network communications device of the target system receives the packet and determines whether the MAC address matches its own MAC address. Upon determining that the MAC address matches its own address the target system generally turns itself on and starts communicating with the system that initiated the wake event.

Currently, this wake mechanism is insecure. In other words, computing devices or platforms do not sufficiently protect against spurious or malicious wake events. A so-called "sniffer" can monitor the packet sent over the communications network used by the two systems. A malicious person can detect such packets and replay them at a later time. A variation of the wake mechanism is referred to as "magic packet+password". The "magic packet+password" is similar to a packet of the "magic packet" but includes an additional six-byte password appended to end. While the "magic packet+password" mechanism does have a password, the password is nonetheless sent unencrypted and susceptible to a replay attack in the same manner as the "magic packet".

Aside from replay attacks, the wake mechanism is insecure in other respects. If the MAC address of the target system is known, anybody within the broadcast domain can wake the system by sending the wakeup packet. While many communication networks may have firewalls which help protect against external threats, one or more computing devices on the internal network may have malfunctioning hardware, malfunctioning software, or software such as virus software that is out of date. In the case of open networks, a virus scanner, which might otherwise handle numerous types of denial of service attacks, may respond too slowly to prevent attacks based on denial of service attacks involving WOL technology.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Methods, apparatuses, and computer program products that respond to wake events of communication networks are contemplated. Some embodiments comprise methods for setting a wake password of a computing device, such as a notebook computer or a server. Some of the embodiments comprise receiving a wake request from a communications network, establishing a secure communication session, and setting the wake password with the secure communication session. Some embodiments may also validate an initial wake password when setting the wake password. Other embodiments may also include changing a power mode of at least one component of the computing device to process the wake request. In some embodiments changing the power mode of one or more components may involve waking a management controller. In some embodiments, establishing the secure communication session may involve establishing a secure communication session with a management controller via a management console. In various embodiments, receiving the wake request may involve receiving a packet header and sixteen instances of a MAC address of the communication device, such as a magic packet.

Some embodiments comprise an apparatus having a network controller to allow one apparatus to communicate via a communications network, non-volatile memory that stores a wake password, and a management controller that may communicate with a management console via a secure communication session to update the wake password. One or more alternative embodiments may have a number of devices coupled to the network controller, with one or more of the devices being capable of being placed in a power conservation mode. In some embodiments the network controller may wake management hardware and/or wake the management controller while keeping one or more of the devices in the power conservation mode. In some embodiments, the management controller may be arranged to process a management event while one or more devices are in the power conservation mode. In various embodiments the types of some devices that may be coupled to the network controller are a processor, a second controller, a display device, and a mass storage device. In one or more embodiments, the network controller may monitor communication packets of the communications network while a device of the platform is in a power conservation mode. In some embodiments, the network controller may validate a password associated with a wake packet of the secure communication session.

Some embodiments may involve a computer program product comprising a computer usable medium having computer usable program code for setting a wake password, evaluating a wake request received via a network controller, establishing a secure communication session with a management controller, and setting the wake password via the secure communication session. One or more embodiments may also include program code for monitoring communication packets of a communications network for the wake request. Some embodiments may include code for placing hardware coupled to the management controller in a power conservation mode. In one or more embodiments the computer usable program code may place the management controller in a power conservation mode. In some embodiments, the computer usable program code may place a processor in an "S3" state. In at least one embodiment, the code may enable the management controller to set the wake password. For some embodiments, the code for evaluating the wake request may be code for validating a password associated with the wake request.

Some of the discussions use the terms "server" and "client". The term "server" may refer to a computer or device on a network that manages network resources. Clients may generally be thought of as computer applications running on computer systems that access the services provided by server applications and dedicated server computers. However, in several instances in the discussion these terms are interchangeable. Accordingly, one should not conclude that a discussion that uses only "client" or "server" terms, as opposed to using "computer" or "computer systems" terms, is meant to limit the discussion to one term or the other. One of ordinary skill in the art will recognize that such variations may be substituted for the described methods and systems, and employed in accordance with similar constraints, to perform substantially equivalent functions.

Figure 1:
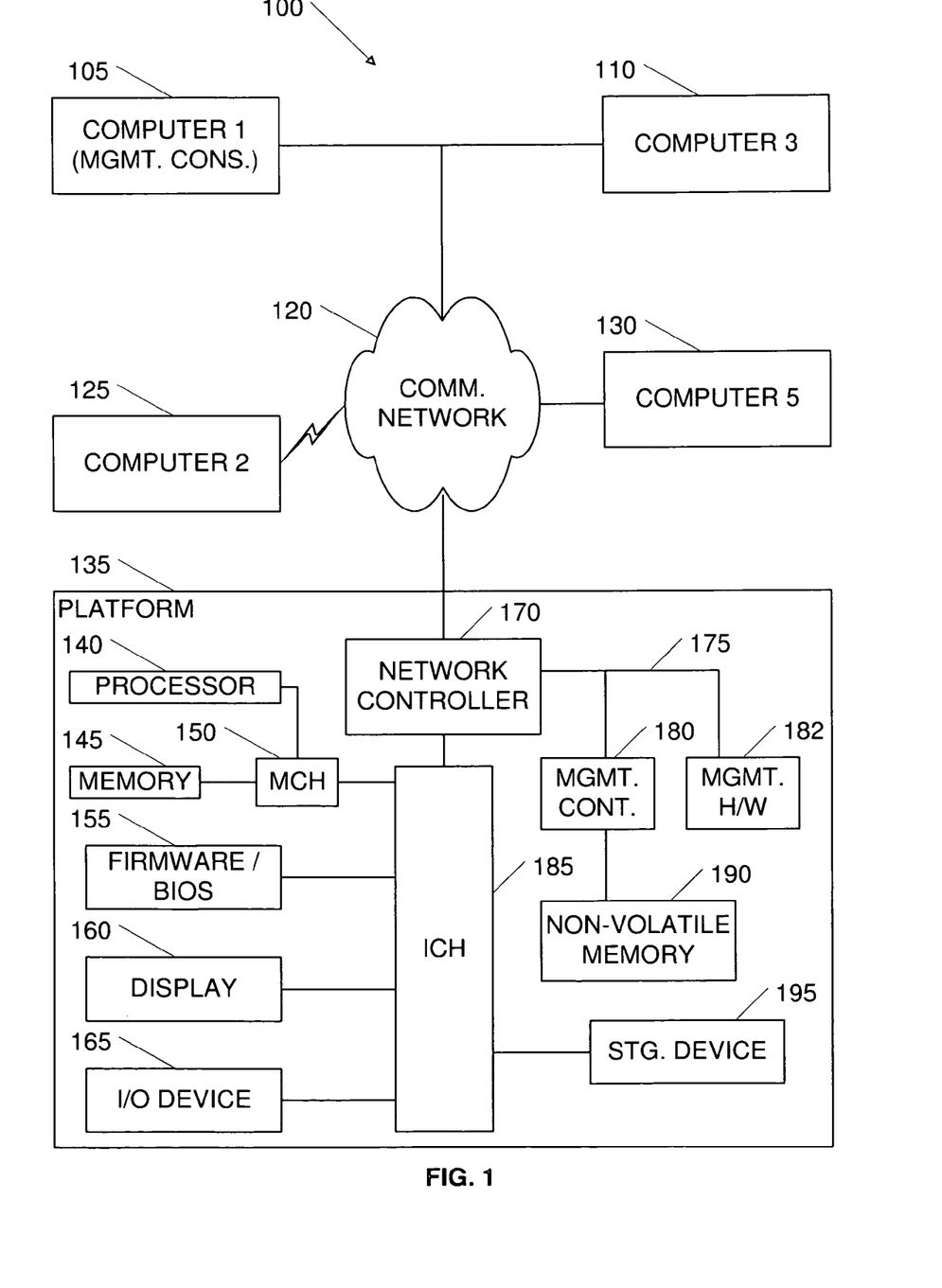
FIG. 1 illustrates how a computing apparatus may respond to wake events of a communications network.

Turning now to the drawings, FIG. 1 illustrates how a computing apparatus may respond to wake events of a communications network. As depicted in FIG. 1, an apparatus or computing device such as platform 135 may be coupled to a communications network 120. Platform 135 may communicate with numerous other computing devices coupled to communications network 120, such as computers 105, 110, 125, and 130. For example, computer 105 and computer 110 may comprise two computers on a LAN or on a remote area network. Similarly, computer 125 may comprise a notebook, desktop, or server computer coupled to communications network 120 by way of a wireless networking card.

In different embodiments platform 135 may comprise a variety of different devices. For example, in one embodiment configuration platform 135 may comprise a server computer. In other embodiments platform 135 may comprise a desktop, a notebook, a hand-held computer, or other type of computing device. Communications network 120 may take on a variety of different forms in different embodiments. In numerous embodiments communications network 120 may comprise one or more networking devices, such as network routers, hubs, switches, and wireless networking devices. Communications network 120 may comprise an isolated network, such as a local area network in a single building. In alternative embodiments, communications network 120 may comprise a wide area network or the Internet. For example, computer 105 and computer 110 may comprise two computers on a local area network, remotely located but able to communicate with platform 135 via the Internet.

In addition to the various types of networking hardware that may couple an apparatus like platform 135 to other computing devices, the method of the communication, such as a communication protocol, may also vary in alternative embodiments. For example, network controller 170 of platform 135 may communicate with other computing devices using one or more protocols, such as a remote management control protocol (RMCP) or a Transmission Control Protocol (TCP) and Internet Protocol (IP). In alternative embodiments, network controller 170 may utilize one or more other communication protocols that conform to open or proprietary standards. For example, network controller 170 may communicate with computer 105 using Open Systems Interconnection (OSI), AppleTalk™, DECnet™, IPX/SPX™, or other protocols.

Platform 135 may comprise numerous components or devices that may be placed in one or more power conservation modes. For example, platform 135 has a processor 140. In some embodiments, processor 140 may comprise a single core processor, while in other embodiments processor 140 may comprise a multiple-core processor. Processor 140 may be coupled to a memory controller hub (MCH) 150. Processor 140 may be capable of executing operating instructions, such as instructions of user applications or an operating system, in memory 145 by interacting with MCH 150. MCH 150 may also couple processor 140 with an input-output (I/O) controller hub (ICH) 185. ICH 185 may allow processor 140 to interact with internal components, such as firmware 155. For example, firmware 155 may comprise basic input-output system (BIOS) code, executed during a boot process or upon exiting a power conservation mode. Processor 140, MCH 150, memory 145, ICH 185, and firmware 155 may all be able of entering one or more power conservation modes, individually or in various combinations. For example, platform 135 may comprise a desktop computer in a business office wherein a user places platform 135 into a sleep mode before going home in the evening. Once in the sleep mode, platform 135 may utilize a communication device such as network controller 170 to monitor communication packets of communications network 120 for wake events, such as a wake request.

Platform 135 may be configured to present information to a user via display 160. For example, display 160 may comprise a computer monitor coupled to an Advanced Graphics Port (AGP) video card. In some embodiments, the type of display device may be a cathode ray tube (CRT) monitor, a liquid crystal display (LCD) screen, or a thin-film transistor flat panel monitor, as examples. I/O device 165 may comprise a keyboard, a mouse, a trackball, a touch-pad, an audio input device, a scanner, one or more computer speakers, or a touch-screen and stylus, as examples. Storage device 195 may comprise a universal serial bus (USB) flash memory drive, a Serial ATA (SATA) device, or an Advanced Technology Attachment (ATA) device, such as an ATA hard drive, a compact disc drive, or a digital versatile disc drive. Storage device 195 may also comprise a small computer systems interface (SCSI) device, such as a SCSI hard drive or a Redundant Array of Inexpensive Disks (RAID). In various embodiments, platform 135 may place one or more of these devices, as well as the hardware components that platform 135 may use to operate them, into one or more power conservation modes. For example, platform may stop presenting information via display 160 and place it into a low-power mode. Additionally, platform 135 may place other peripheral devices into power conservation modes, such as by stopping the platters of a hard drive (storage device 195) and placing it into a power conservation mode.

Once a computing device such as platform 135 has entered a standby or power conservation mode, such as by placing components and/or devices such as processor 140 and storage device 195 into low power modes, network controller 170 may monitor communications of communications network 120 for a wake event. For example, network controller 170 may monitor packets of communications network 120 for a magic packet. In other words, network controller 170 may monitor communication packets of communications network 120, examining the packets for a header of "FF FF FF FF FF FF" followed by sixteen instances of the MAC address of network controller 170. Additionally, network controller 170 may examine the magic packet for a six-byte password appended after the sixteenth instance of the MAC address. The magic packet, and potentially the six-byte password, may have been sent by an administrator of system 100 that is logged on to a remote console or management console, such as computer 105. The system administrator may want to perform some type of maintenance activity on platform 135, such as installing the most current virus signatures on storage device 195 for an anti-virus program of platform 135.

Even though the system administrator may wake platform 135 using a magic packet with a password, platform 135 may nonetheless be vulnerable to a future attack, such as a denial of service attack or a replay attack. Platform 135 may be vulnerable to such an attack because a user of another computer coupled to communications network 120 may monitor and/or record communication packets sent over communications network 120. For example, a user of computer 130 may use a sniffer program to capture the communication packet or packets sent by the system administrator from the management console (computer 105) to platform 135. Even though the system administrator may use a password for the wake event, the user of 130 may capture this password, which is sent in the clear, and replay the entire packet sequence at a later time as part of an attack. For example, a system may comprise fifty or a hundred platforms similar to platform 135, wherein the malicious user of computer 130 monitors the communications of the system administrator as she performs maintenance tasks on all of the computers. The malicious user of computer 130 may replay the wake requests, MAC addresses, and passwords for each of the computers at a later time as part of a denial of service attack. By waking a large number of computers from standby or sleep modes and causing them to enter high power consumption modes, the malicious user of computer 130 may attempt a denial of service attack of system 100. Even if such a denial of service attack is unsuccessful, if all of the computers are repeatedly switched from low power to high power modes, the user of computer 130 may nonetheless cause system 100 to unnecessarily consume substantially more power.

To prevent such an attack, apparatuses such as platform 135 may have firmware logic configured to handle wake events without waking the entire system. For example, the firmware logic of firmware 155 and/or firmware of network controller 170 may allow network controller 170 to wake only management controller 180 and management hardware 182 to process the wake event. In other words, platform 135 may handle the wake event with only network controller 170, management controller 170, and management hardware 182 powered up, with all other components and devices of platform 135 remaining in their respective power conservation modes. Additionally, such firmware logic may be configured to handle such wake events in a secure manner. The firmware logic may enable the computer system administrator to wake platform 135, or a portion of it, create a secure communication session between platform 135 and the remote console being used by the system administrator, and allow the system administrator to change the wake password so that a future replay attack using the previous wake password will be unsuccessful. For example, non-volatile memory 190 may store a wake password. Once network controller 170 receives the magic packet and password and validates the transmitted password by comparing it with the wake password stored in non-volatile memory, the network controller 170 may wake the necessary hardware to process the wake event, such as management controller 180 and a portion of management hardware 182.

Upon waking the necessary hardware, network controller 170 may allow management controller 180 to establish a secure or encrypted communication session between network controller 170 and the remote console. Once the secure communication session is established, the system administrator may change the wake password, wherein management controller 180 may update the previous wake password stored in non-volatile memory 190 with the new wake password. By leaving components and devices of platform 135 that are not needed to handle the wake event in their low power states, the modified firmware logic may allow for greater energy conservation. Additionally, firmware allowing a computer administrator or an automated remote console to securely change the wake password may help prevent future replay or denial of service attacks.

As noted, the embodiment of platform 135 shown in FIG. 1 may comprise a desktop computer, a notebook computer, or a portable computing device such as a palm-held computer. In alternative embodiments, platform 135 may comprise a variety of other computing devices or apparatuses. In numerous embodiments, platform 135 may comprise part of a consumer electronic device. For example, platform 135 may comprise a multimedia device in the home of a consumer, such as a networked personal video recorder (PVR) or digital video recorder (DVR), or a networked audio player capable of streaming audio. In further embodiments, platform 135 may comprise a digital surveillance video camera system or even a smart appliance coupled to a communication network.

Also as noted, an embodiment of an apparatus such as platform 135 may monitor a communications network for a magic packet or other type of wake event. Even though the described scenario involved a magic packet with a password, which comprised a specific header followed by sixteen instances of a MAC address and the password being sent via a TCP/IP protocol, alternative embodiments may respond to different wake events sent in a variety of different ways. For example, network controller 170 may monitor communications network 120 for a wake event, wherein the wake event is sent in a manner that does not involve using a magic packet, or where the wake event is sent using an alternative protocol.

Figure 2:
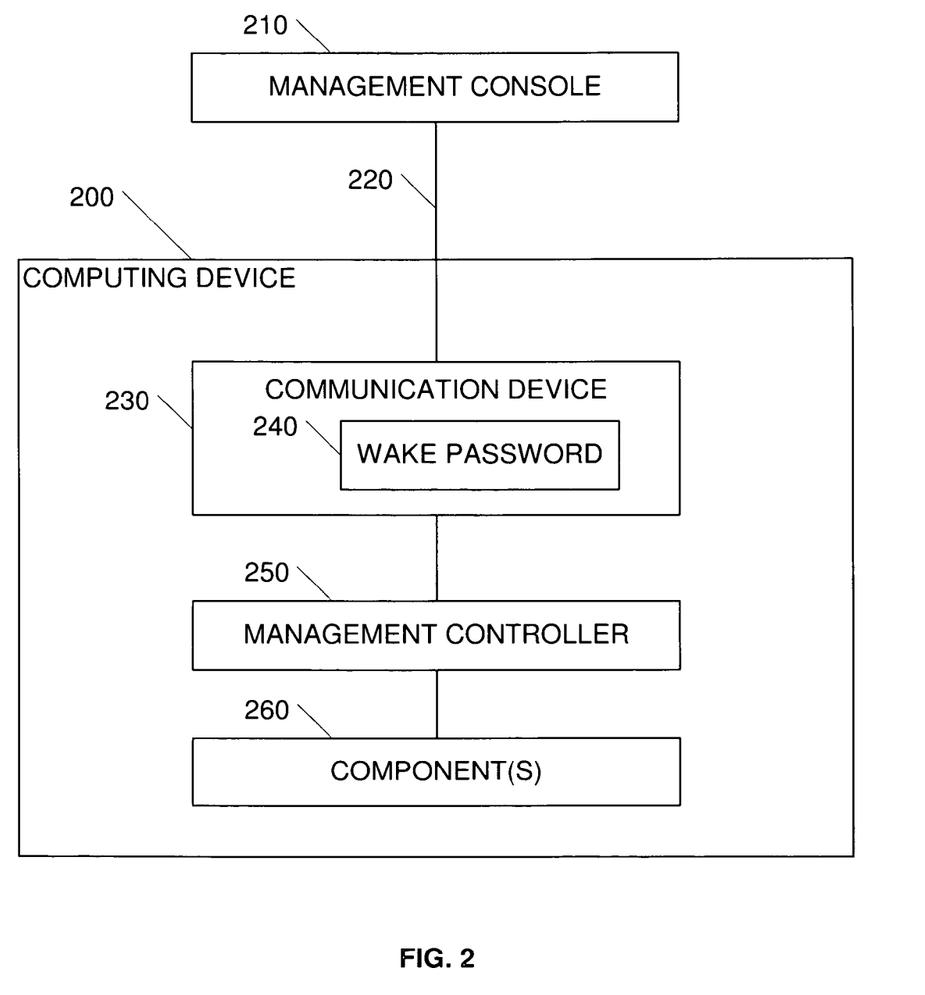
FIG. 2 depicts an embodiment of a computing apparatus capable of securely responding to a wake event of a management console and setting a wake password.

To further illustrate how an embodiment of an apparatus may securely respond to a wake event of a management console and set a wake password, we turn to FIG. 2. FIG. 2 depicts an embodiment of a computing device 200. Computing device 200 may comprise a server computer, a desktop computer, a motherboard of a computer, a peripheral card inserted into a motherboard or main board, or a chip or set of integrated circuit chips of an apparatus. As depicted in FIG. 2, computing device 200 may comprise a communication device 230, a management controller 250, and one or more components 260.

In an embodiment, management controller 250 may comprise an embedded controller that collects or aggregates information about computing device 200 and stores the information in non-volatile memory. For example, management controller 250 may collect information about components 260. Components 260 may comprise sensors that monitor the operation of a central processor of computing device 200. Management controller 250 may collect and store data or information from those sensors, such as temperature measurements, voltage measurements, operating frequencies, error statuses, etc. Components 260 may also comprise hardware and software elements of computing device 200, such as the BIOS, operating system(s) software, firmware chips, proprietary system chips, peripheral cards, peripheral devices, etc. Management controller 250 may collect and store data or information from those hardware and software elements. For example, management controller 250 may store the version of the BIOS, the type and version number of the operating systems, the version of anti-virus software, revision levels of system chips or peripheral cards, the model numbers of peripheral cards, the model number of one or more hard disk drives, the model and firmware versions of a display, etc.

The information collected and stored by management controller 250 may allow an information technology (IT) administrator or an IT technician to perform a variety of management events or management tasks. In other words, the information may allow the IT technician to examine, repair, and maintain computing device 200 from a remote location, such as by using management console 210. For example, the IT technician may examine the hardware and software information stored in non-volatile memory by management controller 250 and determine the asset and/or equipment serial numbers of computing device, 200. The IT technician may also examine the hardware and software information to repair computing device 200 after an operating system crash. In other words, the information stored by management controller 250 may allow the IT technician to perform a variety of different tasks or management events, via a remote console, with the above examples being only a few.

Management controller 250 may comprise a processor, dynamic random access memory, static random access memory, and one or more types of non-volatile memory such as flash memory. While some embodiments may only have one management controller, such as management controller 250, alternative embodiments may have two or more management controllers. For example, an embodiment may have a central management controller, which may be referred to as a baseboard management controller (BMC) that interacts with three other subordinate management controllers, such as three intelligent platform management interface (IPMI) controllers coupled with the BMC over an intelligent platform management bus (IPMB). The different elements that comprise a management controller, such as the memory elements, processor(s) and even portions or sections of those processors may be considered hardware coupled to the management controller. In various embodiments, different parts or hardware sections of a management controller may be placed into a low power mode, in order to help conserve energy. Upon receiving a wake request or other type of wake event, a computing device may have logic that determines how much of the hardware coupled to the management controller should be switched out of low power modes to handle the wake request. For example, in an embodiment that comprises a BMC coupled with two subordinate IPMI controllers, the logic may determine that only certain portions of the BMC need to be powered up to handle the wake request, and that the rest of the BMC and the two IPMI controllers may remain in their low power modes. Such logic may reside in various locations of the computing device. For example, in one embodiment the logic may reside in communication device 230. In an alternative embodiment, the logic may reside in management controller 250.

Management controller 250 may store the information or data of computing device 200 in non-volatile memory within management controller 250. For example, management controller 250 may comprise a single integrated circuit chip having a processor and one megabyte (1 MB) of flash memory storage. However, alternative embodiments may utilize non-volatile memory located elsewhere such as in another part of computing device 200. For example, management controller 250 may store the information in non-volatile memory coupled to an ICH, such as firmware 155 or potentially storage device 195 shown in FIG. 1.

To allow a person, such as an IT administrator, to perform a management event of computing device 200, management controller 250 may communicate with one or more remote consoles such as management console 210 via a communication device such as communication device 230. For example, communication device 230 may comprise a LAN controller coupled to a local area network, such as communications network 220. In one or more embodiments, communication device 230 may allow computing device 200 to communicate with other computing devices on communications network 220 as well as management controller 250. That is to say, communication device 230 may be shared for both communications of management controller 250 and the system communications for computing device 200. In alternative embodiments, communication device 230 may comprise a dedicated LAN controller used only by management controller 250. The physical form of communication device 230 may vary from an embodiment to embodiment. For example, in one embodiment communication device 230 may comprise an embedded LAN controller, yet comprise a communications an add-in card in another embodiment, such as a peripheral component interconnect (PCI) card.

Communication device 230 may be designed in such a way that all or a portion of communication device 230 utilizes standby power and remains operative even when computing device 200 is in a low power mode. Allowing communication device 230, or at least a portion thereof, to remain powered up while the rest of computing device 200 is powered down, including all or part of management controller 250, may allow communication device 230 to monitor the communication packets transmitted via communications network 220 while computing device 200 is in a standby mode or a hibernation mode. While computing device 200 is in a low power mode, communication device 230 may monitor communications network 220 for one or more wake events, such as a wake request sent by an IT administrator from management console 210. For example, computing device 200 may comprise an e-mail server that has automatically entered a standby mode due to inactivity. The IT administrator may wake computing device 200 to perform some type of management-related function. To wake computing device 200 the IT administrator may issue a wake packet to computing device 200 comprising a 'magic packet' plus a password.

In one or more embodiments, management console 210 may transmit the packet for the wake event to computing device 200 and communication device 230 using RMCP. In alternative embodiments, management console 210 may transmit the wake packet or wake request to computing device 200 and/or communication device 230 using another protocol. Upon receiving the wake packet, communication device 230 may first validate the packet or otherwise determine whether the wake packet was intended for computing device 200, or more specifically for communication device 230. For example, communication device 230 may compare the MAC address or other hardware identifying address of the packet and compare it with the MAC or hardware address of communication device 230. If the address matches, meaning the wake packet was intended for communication device 230 and/or computing device 200, communication device 230 may then compare the transmitted password with an initial or previously stored wake password 240. If the transmitted password matches the stored password communication device 230 may then perform one of a variety of different actions depending on the state of other components of computing device 200, including the state of management controller 250.

If management controller 250, or a least a portion thereof, is powered down or otherwise in a low power or sleep state, communication device 230 may power up management controller 250. For example, communication device 230 may power up management controller 250, nonvolatile memory coupled with management controller 250, and one or more management hardware components of management controller 250. In some embodiments, communication device 230 may change the states of such components only as necessary to process the wake event. In alternative embodiments, communication device 230 may indiscriminately apply full operational power to all components of management controller 250 regardless of whether or not they are needed to process the wake event. In even further embodiments, communication device 230 and/or management controller 250 may cause one or more components of computing device 200, such as one or more components 260, to power up or otherwise change power operating modes to process the wake event. For example, one component of components 260 may comprise a hard disk drive needed to process the wake event.

After changing the power modes of components and/or devices a computing device 200, as necessary, the IT administrator may then establish a secure connection or communication session between management console 210 and management controller 250 via communication device 230. For example, management console 210 may establish the connection or session with management controller 250 using any of a number of technologies such as IPMI or Intel® Active Management Technology (AMT). That is to say, the connection or session may depend upon the type of management controller of the embodiment. Additionally, the communication session may utilize scrambled or encrypted packets sent between management console 210 and management controller 250, via communication device 230. For example, management console 210 and communication device 230 may transfer information over communications network 220 using an RMCP+ protocol. In other words, management console 210 and communication device 230 may transfer information using an RMCP packet format but include extensions that support enhanced authentication and encryption.

Upon establishing the secure session between management console 210 and management controller 250, the IT administrator may assign a new password to communication device 230 for the next wake event, such as another Wake On LAN action. For example, the IT administrator may issue a command from management console 210 to management controller 250, requesting that a new wake password be stored to replace the previous wake password 240. Management controller 250 may then work in conjunction with communication device 230 and update or set wake password 240. Setting wake password 240 in such a manner may help prevent a surreptitious observer of communications over communications network 220 from recording the wake password transmitted from management console 210 and later using it in a replay attack of computing device 200. In other words, when computing device 200 is designed to operate in this manner, computing device 200 may employ a secure wake mechanism for waking only management controller 250 and allowing the secure communication mechanism of management controller 250 to wake the system. Changing the wake password, which may be completed immediately in one or more embodiments, may reduce the danger of a replay attack. Additionally, by waking only management controller 250 and minimally necessary components and/or devices, as opposed to waking all of computing device 200, the potential for malicious software being successful in sending a valid wake packet may be less significant since the entire system is not woken, only the management controller and minimal components. Even further, computing device 200 may conserve additional energy by providing a mechanism that allows management controller 250, or a portion thereof, to be powered down when not needed.

Figure 3:
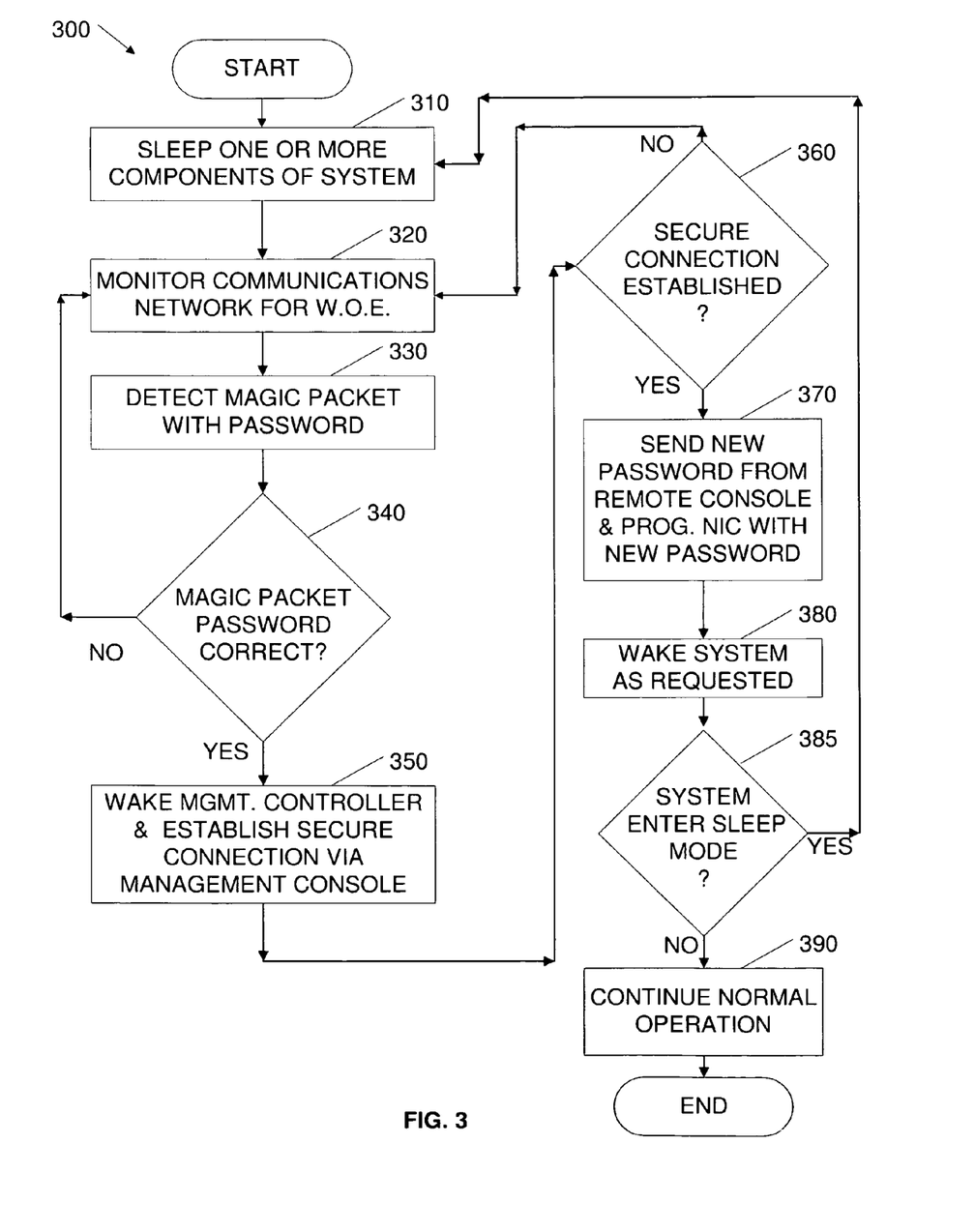
FIG. 3 illustrates a flowchart for an algorithm that may be implemented by a computing device to allow it to provide a secure WOL mechanism.

Apparatuses, such as platform 135 of system 100 depicted in FIG. 1 or computing 20 device 200 in FIG. 2, may provide a secure wake mechanism via one or more software and/or firmware routines. FIG. 3 illustrates a flowchart 300 for an algorithm that may be implemented by a computing device or platform to allow it to provide the secure WOL mechanism. For example, software and/or firmware instructions may perform the events of flowchart 300. Such instructions may be stored in one or more memory components of a platform or computing 25 device, such as in firmware 155, non-volatile memory 190, or in memory components of management controller 180, management hardware 182, and network controller 170 of FIG. 1.

Flowchart 300 begins with placing one or more components of a system in a low power or sleep mode (element 310). For example, platform 135 may place management 30 controller 180, management hardware 182, display 160, storage device 195, and processor 140 in low power modes. Platform 135 may park the heads of storage device 195, turn off display 160, place processor 140 in a low power operational state, such as an "S3" state which may comprise a processor sleep state, and remove power from both management controller 180 and management hardware 182. Platform 135 may provide standby power to network controller 170 in order for it to monitor communication packets of communications network 120 for a wake on LAN event (WOE) (element 320).

Upon detecting a magic packet with an associated password (element 330), computational logic of a network interface controller (NIC) may determine whether the password of the magic packet is correct (element 340). If the magic packet password is not correct, the software and/or firmware instructions may keep many if not all of the components in their respective low power modes and have the network controller/NIC continue monitoring the communications network for a WOE (element 320). For example network controller 170 may receive a magic packet and an invalid password as part of a replay attack from computer 130. Upon receiving the magic packet and verifying that the transmitted MAC address matches that of network controller 170, logic of network controller 170 may nonetheless refrain from automatically powering up processor 140, management controller 180, display 160, and storage device 195 until verifying that the transmitted password is also correct.

If the network controller determines that the magic packet password is correct, the network controller may wake or power up management controller 180 so that the management console may establish a secure connection with management controller 180 (element 350). For example, once network controller 170 wakes management controller 180, computer 105 may establish a secure connection with management controller 180 over communications network 120. If for some reason the management console cannot establish a secure connection with the management controller (element 360), an algorithm according to flowchart 300 may continue by having the network controller continue monitoring the communications network for another WOE (element 320). If, however, the management console is able to establish a secure connection (element 360) then the algorithm may allow the management controller and/or the management console to work in conjunction with the NIC, allow the management console to send a new password to the NIC, and program or change the wake password (element 370). For example, management console 210 of FIG. 2 may work in conjunction with communication device 230 and management controller 250 to change wake password 240 from "0x4BF3E5A0FF32" to "0x4CF4E6A20033".

An algorithm according to flowchart 300 may continue by waking one more components of the apparatus or system, if requested, in order to perform an event specified after the WOE (element 380). For example, an IT administrator situated at computer 105 may want to load a more recent version of a software program on platform 135. After updating the wake password, the IT administrator may issue a series of commands via the established secure connection, requesting that platform 135 receive and store the more recent software program onto storage device 195. In order to carry out these commands, logic of network controller 170 may determine that processor 140 and storage device 195 need to be powered up but the remaining components such as display 160, I/O device 165, and portions of management hardware 182 may remain in their respective low power modes.

Upon performing the requested maintenance activities after updating the wake password, an algorithm according to flowchart 300 may continue by determining whether the platform may reenter the sleep mode (element 385). For example, network controller 170 may be programmed to initiate a sleep request for platform 135 after a period of inactivity of communications from communications network 120. If the algorithm determines that the platform may not reenter the sleep mode, the firmware and/or software instructions may permit the platform to continue normal operation (element 390).

Figure 4:
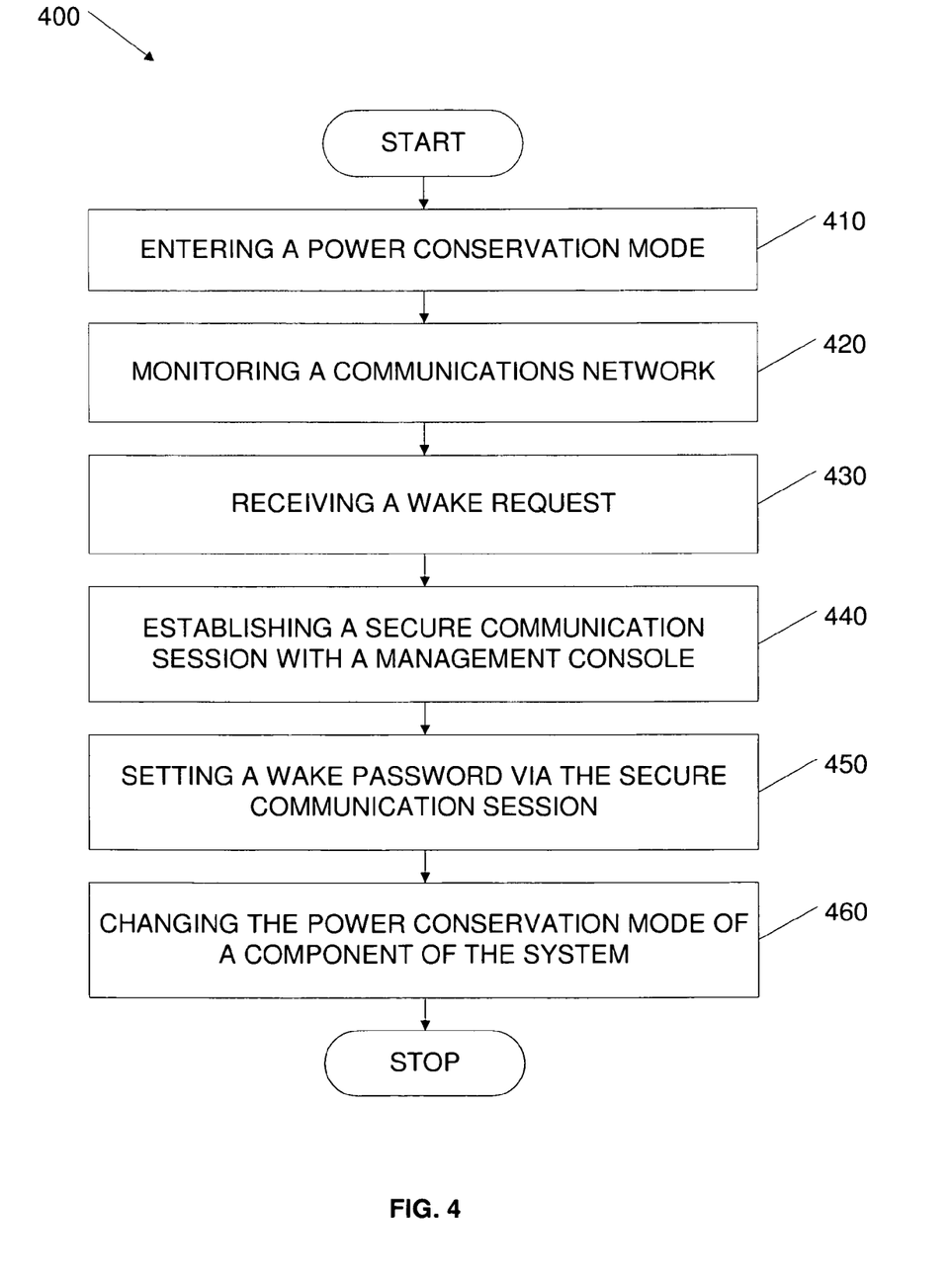
FIG. 4 illustrates a method of responding to a wake event and securely changing a wake password.

We move now to FIG. 4, which illustrates a method of responding to a wake event and securely changing a wake password. Flowchart 400 begins with having a computing device enter a power conservation mode (element 410). For example, a user of a laptop such as computing device 200 may press a button and force the laptop to enter a standby mode. While in this standby mode numerous devices and components of components 260 may be placed into low power operational modes. For example, one of components 260 may comprise a central processor for the laptop. By initiating the standby mode, the user may force the processor to change from an "S0" state, wherein the processor appears to be "on" and fully operational, to an "S3" state, which may comprise a low wake latency sleeping state in which all device contexts are lost except system memory. Transitioning from "S0" to "S3" is merely one example. Other state transitions are possible, such as a transition from "S0" to "S4" or a transition from "S1" to "S2".

A method according to flowchart 400 may continue by monitoring a communications network (element 420) and receiving a wake request (element 430). For example, a communications device in a PCI slot of a motherboard may operate from standby power and monitor traffic of a communications network for a wake request. The wake request may arrive from different types of communication networks in various embodiments, such as by a direct serial connection, a LAN connection, or a serial over LAN (SOL) connection to a remote client. After receiving the wake request (element 430), a platform or apparatus performing the method of flowchart 400 may establish a secure communication session with a management console (element 440). For example, after receiving a wake request from management console 210 communication device 230 may wake management controller 250 so that management controller 250 may establish an RMCP+ session with management console 210.

After establishing a secure communication session (element 440), the method according to flowchart 400 may then allow a wake password to be updated or set via the secure communication session (element 450). Continuing with our previous example, management controller 250 may allow the user of management console 210 to change the initial or previous version of wake password 240 during the secure RMCP+ session.

After allowing a wake password to be set via the secure communication session (element 450), the method according to flowchart 400 may then allow the management controller, or some other device hardware and/or software, to change the power conservation mode of one or more components of the system (element 460). For example, management controller 180 may change the power modes of a subordinate management controller, non-volatile memory 190, and a subset or portion of management hardware 182 in order to provide system status information to a systems administrator using computer 105.

The elements described for a method according to flowchart 400 may comprise the elements of one embodiment. Other embodiments may include more elements or fewer elements. For example, an alternative embodiment may monitor the communications network for a wake-on-VOIP (voice over internet protocol) event in addition to other wake on LAN events.

Another embodiment of the invention is implemented as a program product for use with a computing device or platform to respond to wake events of communication networks. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, apparatuses, and computer program products that respond to wake events of communication networks. It is understood that the form of the invention shown and described in the detailed description and the drawings are to be taken merely as examples. It is intended that the following claims be interpreted broadly to embrace all the variations of the embodiments disclosed.

Although the present invention and some of its aspects have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of processing a remote wake request, comprising:
   receiving, by a communication device of a first computing device, from a second computing device, a wake request and a wake password via a communications network;
   waking by the communication device of the first computing device at least one component of the first computing device;
   validating the wake request by the communication device and the at least one component of the first computing device; and
   waking one or more additional components of the first computing device as a result of validating the wake request, wherein the waking by the communication device of the first computing device the at least one component of the first computing device comprises waking by the communication device of the first computing device a management controller; and
   establishing by the management controller a secure communication session between the first computing device and the second computing device and, wherein the waking the one or more additional components of the first computing device as a result of validating the wake request comprises waking the one or more additional components of the first computing device after establishing by the management controller the secure communication session.

2. The method of claim 1, wherein the validating the wake request comprises validating the wake password of the wake request.

3. The method of claim 1, further comprising changing the wake password via the secure communication session; and wherein the waking the one or more additional components of the first computing device as a result of validating the wake request comprises waking the one or more additional components after changing the current wake password.

4. The method of claim 1, wherein
   the secure communication session utilizes a form of an RMCP protocol.

5. The method of claim 4, wherein:
   the establishing the secure communication session comprises establishing an encrypted communication session between the management controller of the first computing device and a management console of the second computing device; and the method further comprises changing a current wake password via the secure communication session to enable the first computing device to exit a sleep state in response to reception of a changed wake password for a subsequent wake request.

6. The method of claim 1, wherein the receiving the wake request comprises receiving a packet header and sixteen instances of a media access control address of the communication device.

7. The method of claim 4, wherein the establishing the secure communication session utilizing a form of an RMCP protocol comprises establishing the secure communication session utilizing an RMCP+ protocol.

8. An apparatus contained in a first computing device, comprising:
   a network controller to communicate via a communications network, communications to comprise receiving a wake request and a wake password;
   a non-volatile memory coupled to the network controller, wherein the non-volatile memory is arranged to store a current wake password; and
   a management controller coupled to the network controller, wherein:
      the network controller is arranged to wake the management controller;
      the network controller is coupled to the management controller to validate the wake request;
      the management controller is arranged to establish a secure communication session between the first computing device and a second computing device;
      the management controller is arranged to set the current wake password; and
      the apparatus is to awaken one or more additional components of the first computing device as a result of validating the wake request, wherein the one or more additional components of the first computing device are awaken after establishment, by the management controller, of the secure communication session.

9. The apparatus of claim 8, further comprising a number of devices coupled to the network controller, wherein at least one device of the number of devices is capable of being placed in a power conservation mode.

10. The apparatus of claim 9, further comprising a management hardware coupled to the management controller, wherein the network controller is arranged to wake the management hardware and to keep the at least one device in the power conservation mode upon communication with a management console.

11. The apparatus of claim 10, wherein the management controller is arranged to process a management event while the at least one device is in the power conservation mode.

12. The apparatus of claim 9, wherein the at least one device comprises at least one of a central processor, a second controller, a display device, and a mass storage device.

13. The apparatus of claim 8, wherein the management controller is arranged to establish a secure communication session with a management console, wherein the secure communication session utilizes a form of an RMCP protocol.

14. A computer program product comprising a non-transitory computer usable medium having computer usable program code for processing a remote wake request of a first computing device, the computer program product comprising:
  computer usable program code for receiving a wake request and a wake password via a network controller of the first computing device;
  computer usable program code for waking, by the network controller, a management controller of the first computing device, the management controller coupled to the network controller;
  computer usable program code for validating the wake request by the communication device and the management controller; and
  computer usable program code for waking one or more additional components of the first computing device as a result of validating the wake request;
  computer usable program code for establishing, by the management controller, an encrypted communication session, wherein the computer usable program code for waking, by the network controller, the management controller comprises computer usable program code for waking a subset of hardware coupled to the management controller, wherein the subset of hardware enables the management controller to change a current wake password.

15. The computer program product of claim 14, further comprising computer usable program code for placing a processor in a sleep state, the processor coupled to the management controller.

16. The computer program product of claim 14, wherein:
  the computer program product further comprises computer usable program code for establishing, by the management controller, an encrypted communication session that utilizes a form of an RMCP protocol; and
  the computer program product further comprises computer usable program code for changing the current wake password, wherein the computer usable program code for waking one or more additional components of the first computing device as a result of validating the wake request comprises waking the one or more additional components of the first computing device after the establishing, by the management controller, the encrypted communication session and after the changing the current wake password.

17. The computer program product of claim 16, wherein the computer usable program code for establishing an encrypted communication session with a management controller in response to the evaluation of the wake request, the encrypted communication session utilizing a form of an RMCP protocol establishes an encrypted communication session utilizing an RMCP+ protocol.

18. The computer program product of claim 16, wherein the computer usable program code for waking the one or more additional components of the first computing device as a result of validating the wake request comprises computer usable program code for waking the one or more additional components of the first computing device after changing the current wake password.

19. The computer program product of claim 14, wherein the computer usable program code for validating the wake request comprises computer usable program code for validating the wake password.

* * * * *